(12) United States Patent
Sun et al.

(10) Patent No.: US 8,248,781 B2
(45) Date of Patent: Aug. 21, 2012

(54) COMPUTER SYSTEM WITH WASTE HEAT RECYCLING DEVICE

(75) Inventors: Zheng-Heng Sun, Taipei Hsien (TW); Xiao-Feng Ma, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 165 days.

(21) Appl. No.: 12/861,036

(22) Filed: Aug. 23, 2010

(65) Prior Publication Data

US 2011/0261527 A1      Oct. 27, 2011

(30) Foreign Application Priority Data

Apr. 21, 2010    (CN) .......................... 2010 1 0151953

(51) Int. Cl.
*H05K 7/20* (2006.01)
*F16L 23/00* (2006.01)
(52) U.S. Cl. .................. 361/679.49; 361/695; 454/184; 285/406; 285/407; 285/415

(58) Field of Classification Search .................. None
See application file for complete search history.

(56) References Cited

U.S. PATENT DOCUMENTS

| | | | | |
|---|---|---|---|---|
| 5,160,811 A * | 11/1992 | Ritzmann | ..................... | 174/68.3 |
| 6,460,901 B2 * | 10/2002 | Rochelle | ....................... | 285/387 |
| 6,709,021 B2 * | 3/2004 | Duncan et al. | ................ | 285/109 |
| 6,726,254 B2 * | 4/2004 | Feichtinger | .................. | 285/365 |
| 6,930,882 B2 * | 8/2005 | Broder et al. | ................. | 361/695 |
| 7,240,930 B2 * | 7/2007 | Stravitz | ........................ | 285/419 |
| 7,445,252 B2 * | 11/2008 | Ho | ................................ | 285/409 |
| 7,503,589 B2 * | 3/2009 | Kidman et al. | ............... | 285/242 |
| 7,735,667 B2 * | 6/2010 | Schutz | .......................... | 215/276 |
| 2004/0004812 A1 * | 1/2004 | Curlee et al. | .................. | 361/687 |
| 2011/0018263 A1 * | 1/2011 | Ignaczak et al. | ............. | 285/374 |

* cited by examiner

*Primary Examiner* — Boris Chervinsky
(74) *Attorney, Agent, or Firm* — Altis Law Group, Inc.

(57) ABSTRACT

A waste heat recycling device includes an air-duct, a fan and a retaining mechanism. The air-duct is connected to a heat air. The fan communicates with the air-duct. The retaining mechanism clasps the air-duct and retains the fan. The retaining mechanism includes a clip and a support ring. An edge of the air-duct is sandwiched between the clip and the support ring.

17 Claims, 5 Drawing Sheets

COMPUTER SYSTEM WITH WASTE HEAT RECYCLING DEVICE

BACKGROUND

1. Technical Field

The present disclosure relates to computer systems, and more particularly to a computer system with a waste heat recycling device.

2. Description of Related Art

Computer systems have attained widespread use in many segments of today's modern society. Computer systems are typically provided with enclosures, which protect the operating components therein. Many components of computers generate heat during operation, making it necessary to cool those components so that proper operation continues. Because of the confined space of the enclosure, natural heat dissipation is difficult. Cooling strategies for computers usually rely upon forced airflow through the computer enclosure. It can be a waste to exhaust the heat which can be reused directed to the air from the computer system, for example, the heat air can be guided to warm hand or warm cold room.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
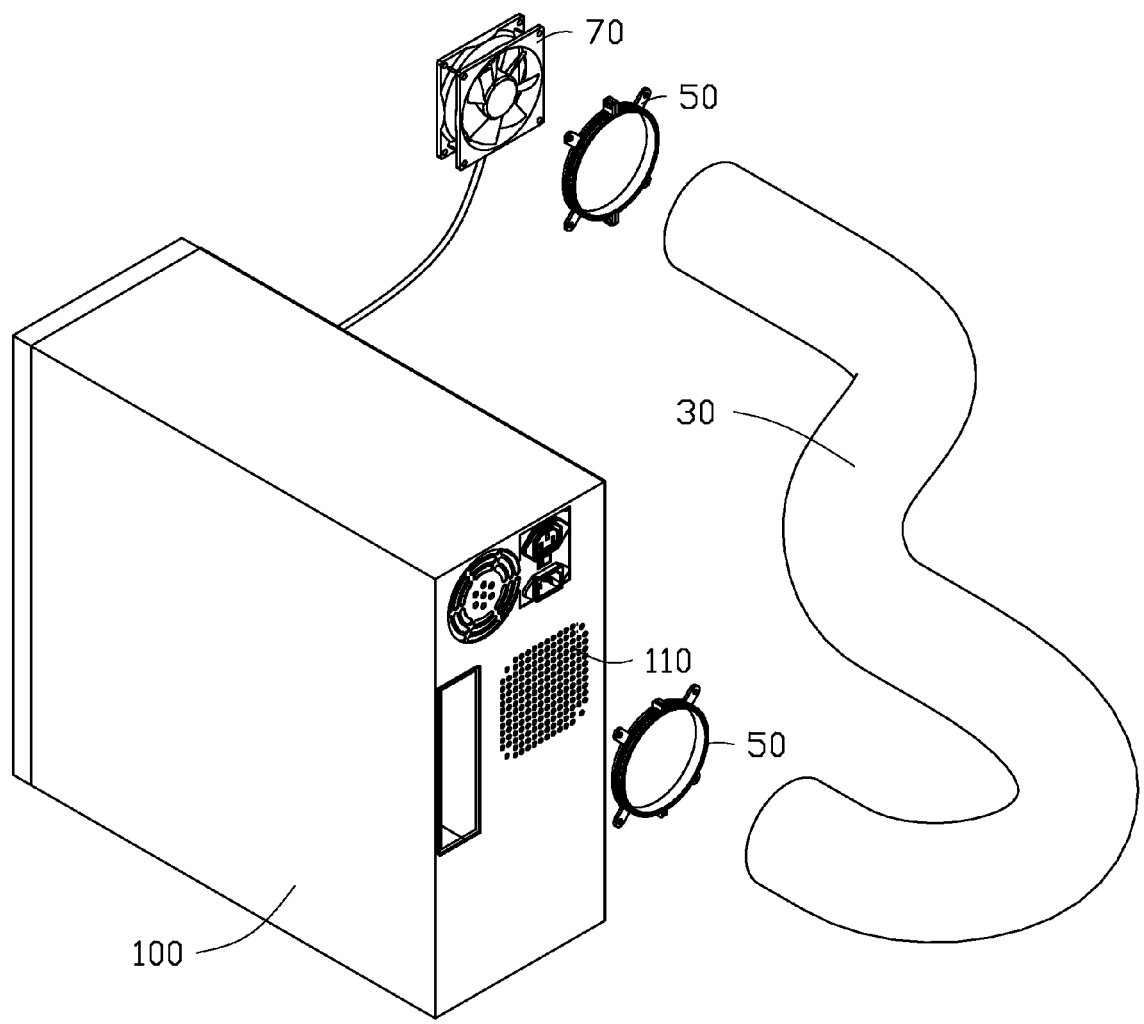
FIG. 1 is an exploded, isometric view of an embodiment of a computer system.

Referring to FIG. 1, one embodiment of a computer system includes a computer 100, an air-duct 30, two retaining mechanisms 50, and a fan 70. The two retaining mechanisms 50 are respectively used for connecting an end of the air-duct 30 to the computer 100, and another end of the air-duct 30 to the fan 70.

The computer 100 has an enclosure. The enclosure has a heat air outlet 110 to dissipate heat from the computer 100. In one embodiment, the air-duct 30 is a flexible pipe.

Figure 2:
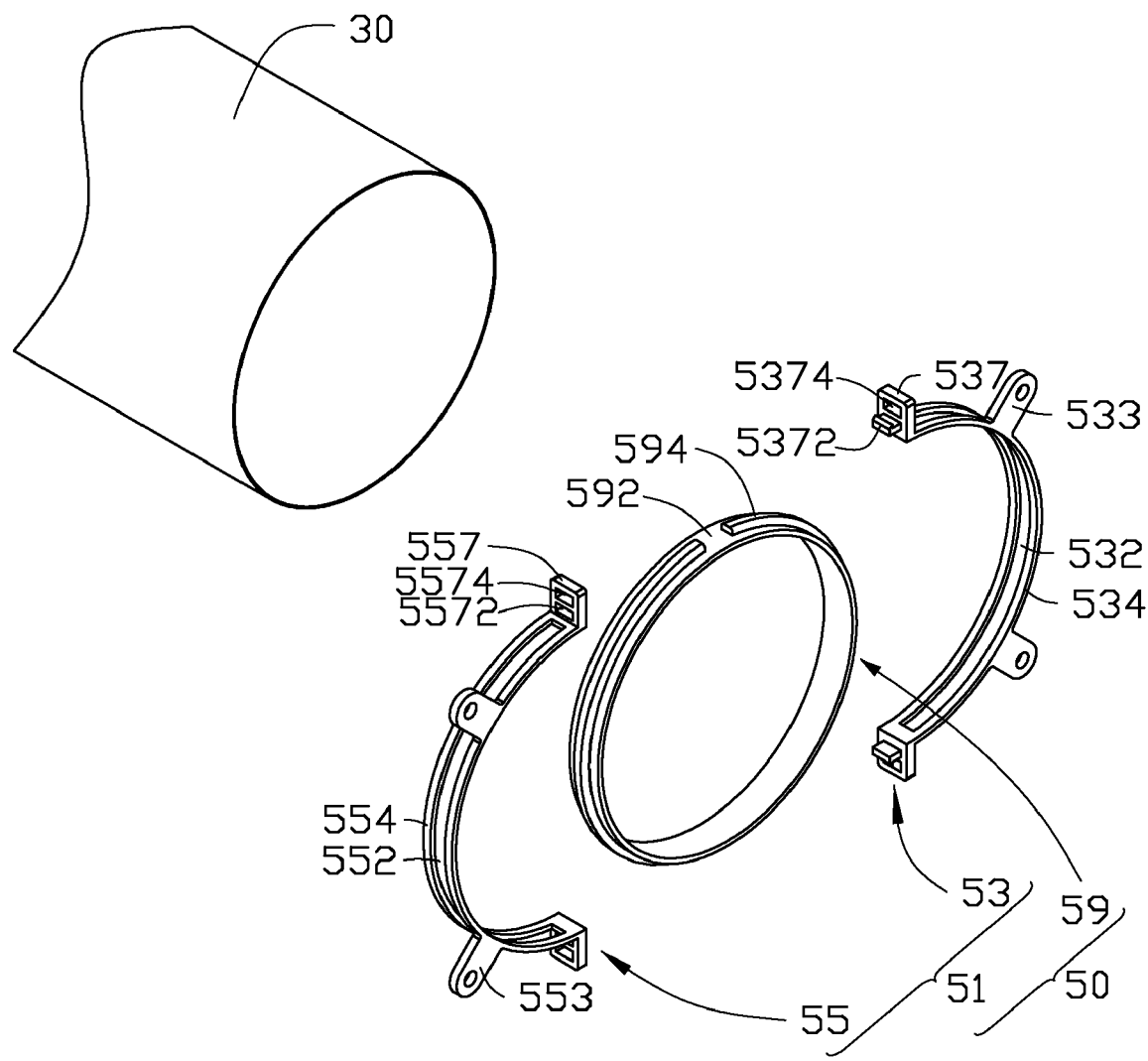
FIG. 2 is an exploded view of a retaining mechanism and a partial view of air-duct of FIG. 1.

Referring to FIG. 2, the retaining mechanism 50 includes a clip 51 and a support ring 59. The support ring 59 includes a circular main body 592 and two ridges 594 located on the main body 592. Each ridge 594 extends along a periphery of the circular main body 592 and is located on a middle portion of the main body 592. In one embodiment, the clip 51 can further include two clasped sub-clips 53 and 55. The two sub-clips 53 may have same structure or corresponding structures in different embodiments. Take sub-clip 53 for example, the sub-clip 53 has a locking portion 534 and two retaining portions 537 located at two end portions of the locking portion 534. A slot 532 is defined in a middle portion the locking portion 534 corresponding to the ridge 594. Two locking tabs 533 are located on the locking portion 534 to connect to the computer 100 or the fan 70. The sub-clip 55 also has a locking portion 554, two locking tabs 553, two retaining portions 557 and a slot 552. Alternative structures of the sub-clips 53 and 55 may be incorporated onto the retaining portion 537.

In one embodiment as shown in FIG. 2, each retaining portion 537 has a buckle 5372, and a retaining hole 5572 is defined in each retaining portion 557 to engage with the buckle 5372.

Figure 3:
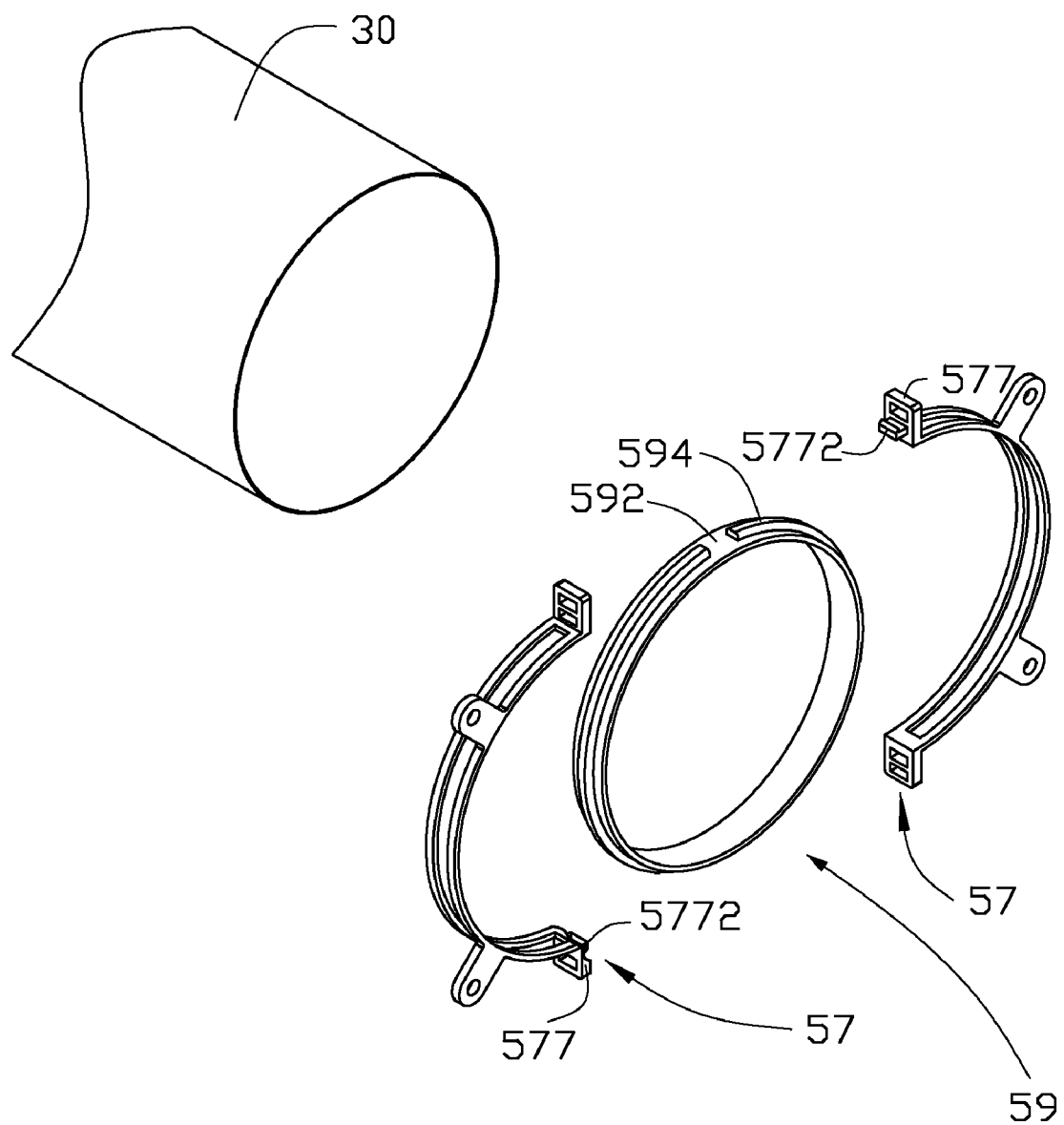
FIG. 3 is an embodiment of a retaining mechanism.

Referring to FIG. 3, in another embodiment, a clip may include two sub-clips 57 having the same structure. Each sub-clip 57 includes two retaining portions 577, one of the two retaining portions 577 has a buckle 5772. The two sub-clips 57 can be clasped to each other.

Two hanging holes 5374 and 5574 are respectively defined in the retaining portion 537 and the corresponding retaining portion 557. The two hanging holes 5374 and 5574 are aligned with each other.

Figure 4:
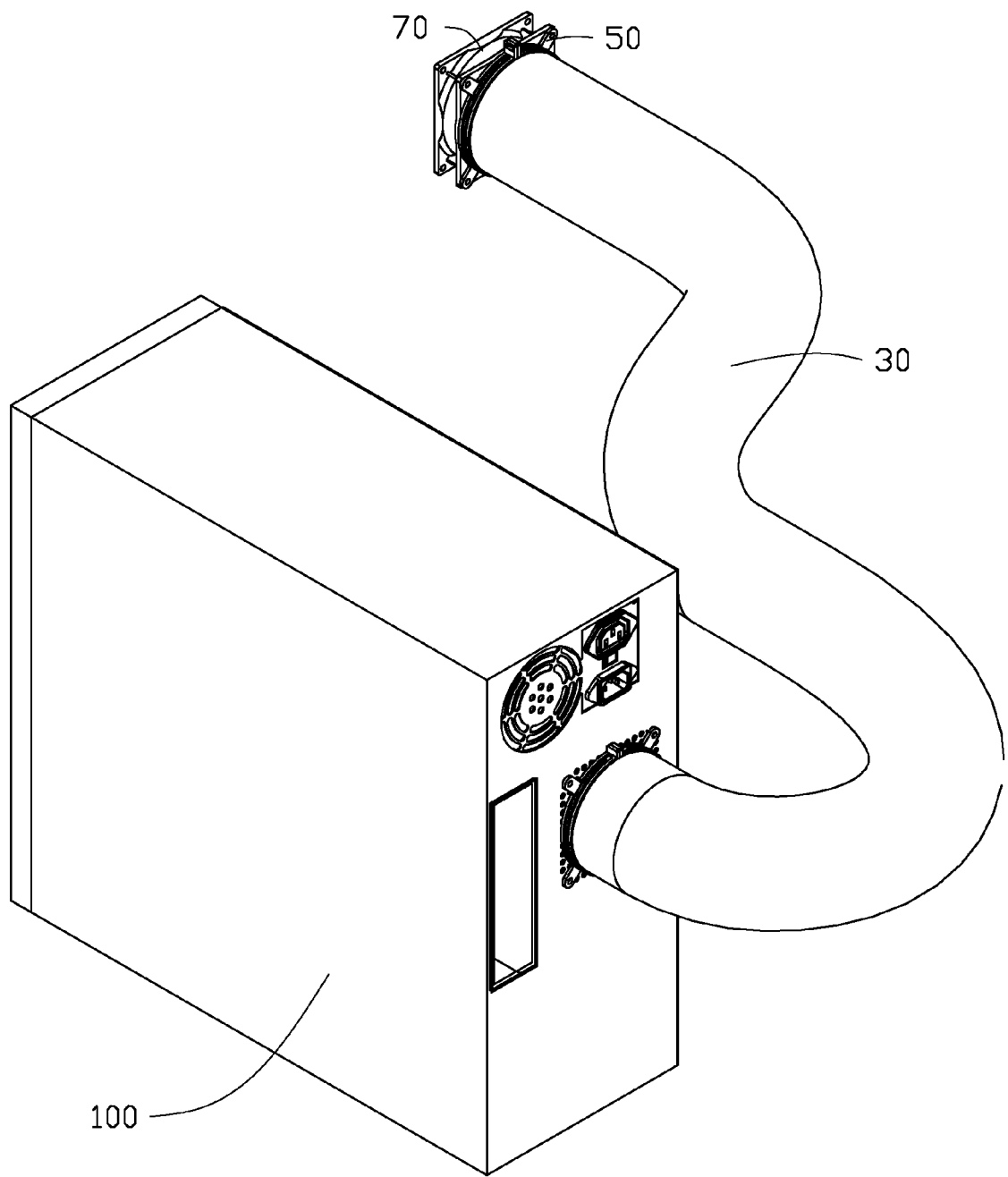
FIG. 4 is an assembled view of the computer system of FIG. 1.

Referring to FIG. 4, when assembling the computer system, the support ring 59 is aligned with an edge of the air-duct 30. The air-duct 30 extends and covers on the support ring 59. The two sub-clips 53, 55 are respectively mounted to the support ring 59 with the slots 532 and 552 respectively engaged with the corresponding ridges 594. The two sub-clips 53 and 55 are clasped to each other with the buckles 5372 received in the corresponding retaining holes 5572. The edge of the air-duct 30 is sandwiched between the main body 592 and the locking portions 534 and 554 by engagement of the support ring 59 and the clip 51. The two hanging holes 5374 and 5574 are aligned. The fan 70 is fixed to the retaining mechanism 50 on the locking tabs 533 and 553 to cover the air-duct 30. The retaining mechanism 50 is positioned between the computer 100 and the inlet of the air-duct 30 is fixed in a similar way.

Figure 5:
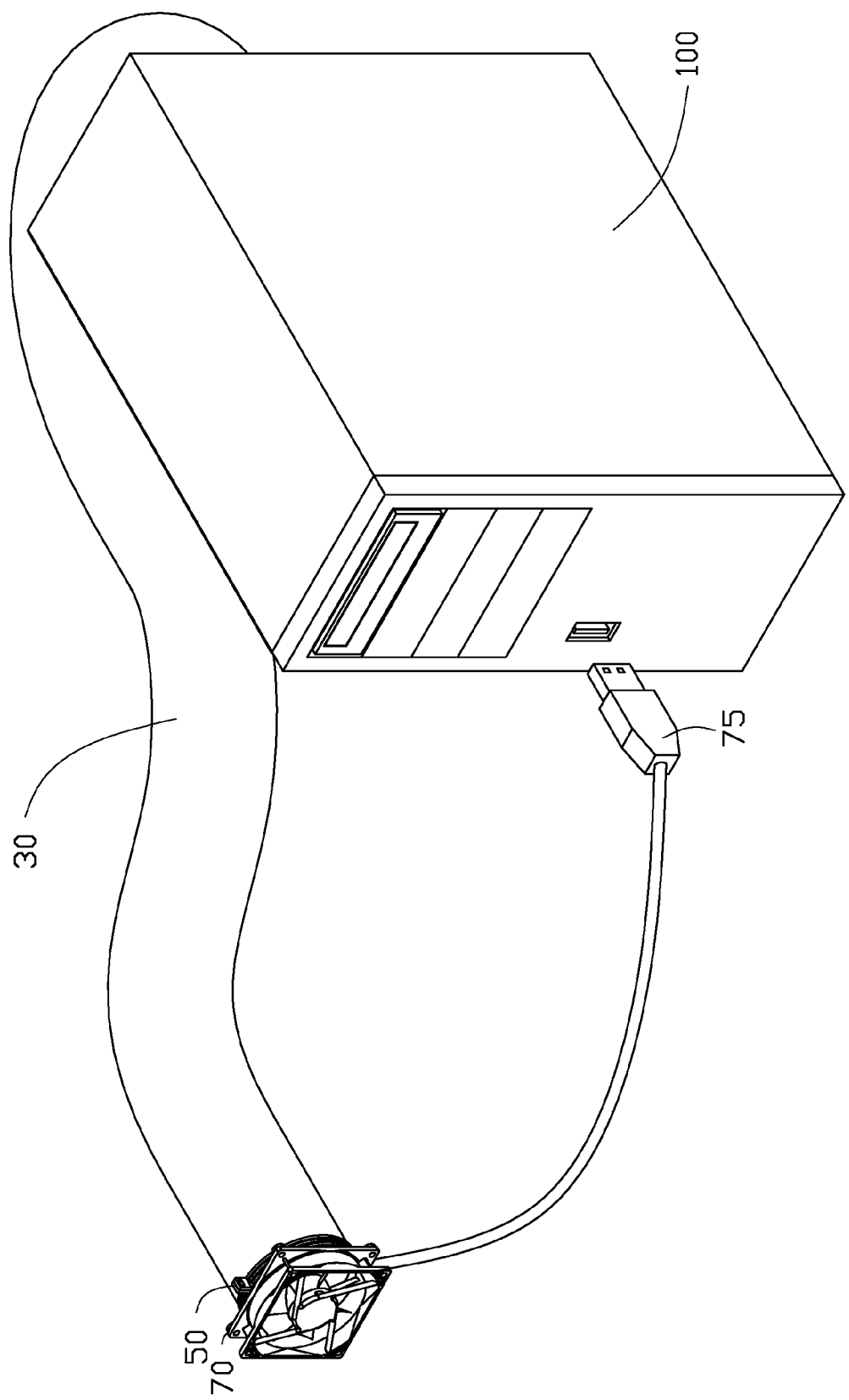
FIG. 5 is similar to FIG. 3, but viewed from another aspect.

Referring to FIG. 5, the fan 70 includes a connector 75, such as a USB port, to receive power from a USB connector of the computer 100. The fan 70 can accelerate the removal of heat air from the computer 100. The heated air can be recycled from the air-duct 30.

It is also to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A waste heat recycling device comprising:
    an air-duct connected to a heat air outlet;
    a fan in communication with the air-duct; and
    a retaining mechanism clasping the air-duct and retaining the fan, the retaining mechanism comprising a clip and a support ring, and an edge of the air-duct being sandwiched between the clip and the support ring.

2. The waste heat recycling device of claim 1, wherein the air-duct is flexible.

3. The waste heat recycling device of claim 1, wherein the support ring comprises a circular main body and a ridge located on the circular main body, a slot is defined in the clip, the ridge is capable of mating with the clip, and the air-duct is located about the ridge and retained by being sandwiched between the ridge and the clip.

4. The waste heat recycling device of claim 3, wherein the ridge extends along a periphery of the circular main body and the ridge is located on a middle portion of the circular main body.

5. The waste heat recycling device of claim 3, wherein the clip comprises a locking portion, and an outlet edge of the air-duct is sandwiched between the circular main body and the locking portion.

6. The waste heat recycling device of claim 1, wherein the clip comprises two interlocking sub-clips, and each of the two interlocking sub-clips comprises a resilient buckle and a corresponding retaining hole that clasp the interlocking sub-clips to each other.

7. The waste heat recycling device of claim 6, wherein each sub-clip comprises a hanging hole, and the hanging holes are aligned with each other.

8. The waste heat recycling device of claim 6, wherein the two interlocking sub-clips have same structure.

9. A computer system comprising:
a computer having a heat air outlet on an enclosure;
an air-duct connected to the heat air outlet;
a fan in communication with the air-duct; and
a retaining mechanism clasping the air-duct and retaining the fan, the retaining mechanism comprising a clip and a support ring, and an edge of the air-duct being sandwiched between the clip and the support ring.

10. The computer system of claim 9, wherein the fan is powered by the computer.

11. The computer system of claim 9, wherein the air-duct is flexible.

12. The computer system of claim 9, wherein the support ring comprises a circular main body and a ridge located on the circular main body, a slot is defined in the clip, the ridge is capable of mating with the clip, and the air-duct covers the ridge and is retained by an engagement of the ridge and the clip.

13. The computer system of claim 12, wherein the ridge extends along a periphery of the circular main body, and the ridge is located on a middle portion of the circular main body.

14. The computer system of claim 12, wherein the clip comprises a locking portion beside the slot, and an outlet edge of the air-duct is sandwiched between the circular main body and the locking portion.

15. The computer system of claim 9, wherein the clip comprises two interlocking sub-clips, and the each of two interlocking sub-clips comprise a resilient buckle and a corresponding retaining hole that clasp the interlocking sub-clips to each other.

16. The computer system of claim 15, wherein each sub-clip comprises a hanging hole, and the hanging holes are aligned with each other.

17. The computer system of claim 15, wherein the two interlocking sub-clips have same structure.

* * * * *